United States Patent

Ramm-Schmidt et al.

[11] Patent Number: 6,068,730
[45] Date of Patent: *May 30, 2000

[54] LIQUID DISTRIBUTOR FOR EVAPORATOR

[75] Inventors: Leif Ramm-Schmidt, Kirkkonummi; Veli Tiainen, Klaukkala; Peter Koistinen, Espoo; Hemmo Eriksson, Vantaa, all of Finland

[73] Assignee: Hadwaco Ltd Oy, Finland

[*] Notice: This patent is subject to a terminal disclaimer.

[21] Appl. No.: 09/029,053
[22] PCT Filed: Aug. 21, 1996
[86] PCT No.: PCT/FI96/00449
§ 371 Date: Jul. 17, 1998
§ 102(e) Date: Jul. 17, 1998
[87] PCT Pub. No.: WO97/07867
PCT Pub. Date: Mar. 6, 1997

[30] Foreign Application Priority Data

Aug. 22, 1995 [FI] Finland ................................. 953929

[51] Int. Cl.[7] ................ B01D 1/30; B01D 1/22; F28F 13/08
[52] U.S. Cl. ............ 159/43.1; 159/15; 159/13.2; 159/26.2; 165/115; 165/118; 165/146; 165/914; 165/100; 165/147; 261/97; 261/110
[58] Field of Search .................... 159/43.1, 14, 15, 159/26.2, 43.2, 27.4, 13.2, 13.3; 165/147, 100, 115, 118, 914, 146, 183; 202/239, 270, 236, 182; 261/97, 110; 239/193

[56] References Cited

U.S. PATENT DOCUMENTS

| | | | |
|---|---|---|---|
| 3,006,623 | 10/1961 | Ross et al. | 261/110 |
| 3,011,723 | 12/1961 | Van Weele | 239/193 |
| 4,264,538 | 4/1981 | Moore et al. | 261/97 |
| 4,708,856 | 11/1987 | Rukovena, Jr. | 423/242 |
| 5,195,578 | 3/1993 | Le Goff et al. | 159/27.4 |
| 5,512,141 | 4/1996 | Koistinen et al. | 159/13.1 |
| 5,755,924 | 5/1998 | Feres | 159/28.6 |
| 5,904,807 | 5/1999 | Ramm-Schmidt et al. | 159/43.1 |
| 5,927,383 | 7/1999 | Ramm-Schmidt et al. | 165/46 |

FOREIGN PATENT DOCUMENTS

| | | |
|---|---|---|
| 94217 | 3/1995 | Finland . |
| 3419172 | 9/1985 | Germany . |
| WO 95/08381 | 3/1995 | WIPO . |
| WO 96/09872 | 4/1996 | WIPO . |

*Primary Examiner*—Virginia Manoharan
*Attorney, Agent, or Firm*—Lahive & Cockfield, LLP

[57] ABSTRACT

A liquid distributor for distributing liquid over the heat transfer surface of an evaporator includes a channel array including one or more supply channels and downwardly deviating distribution channels. Each distribution channel has a step-shaped expansion located downstream with respect to the supply channel and connecting therewith via a sharp point, restricting the liquid suction created in the distribution channel. Sharp points provided in the supply channel or channels further restrict the liquid suction.

10 Claims, 1 Drawing Sheet

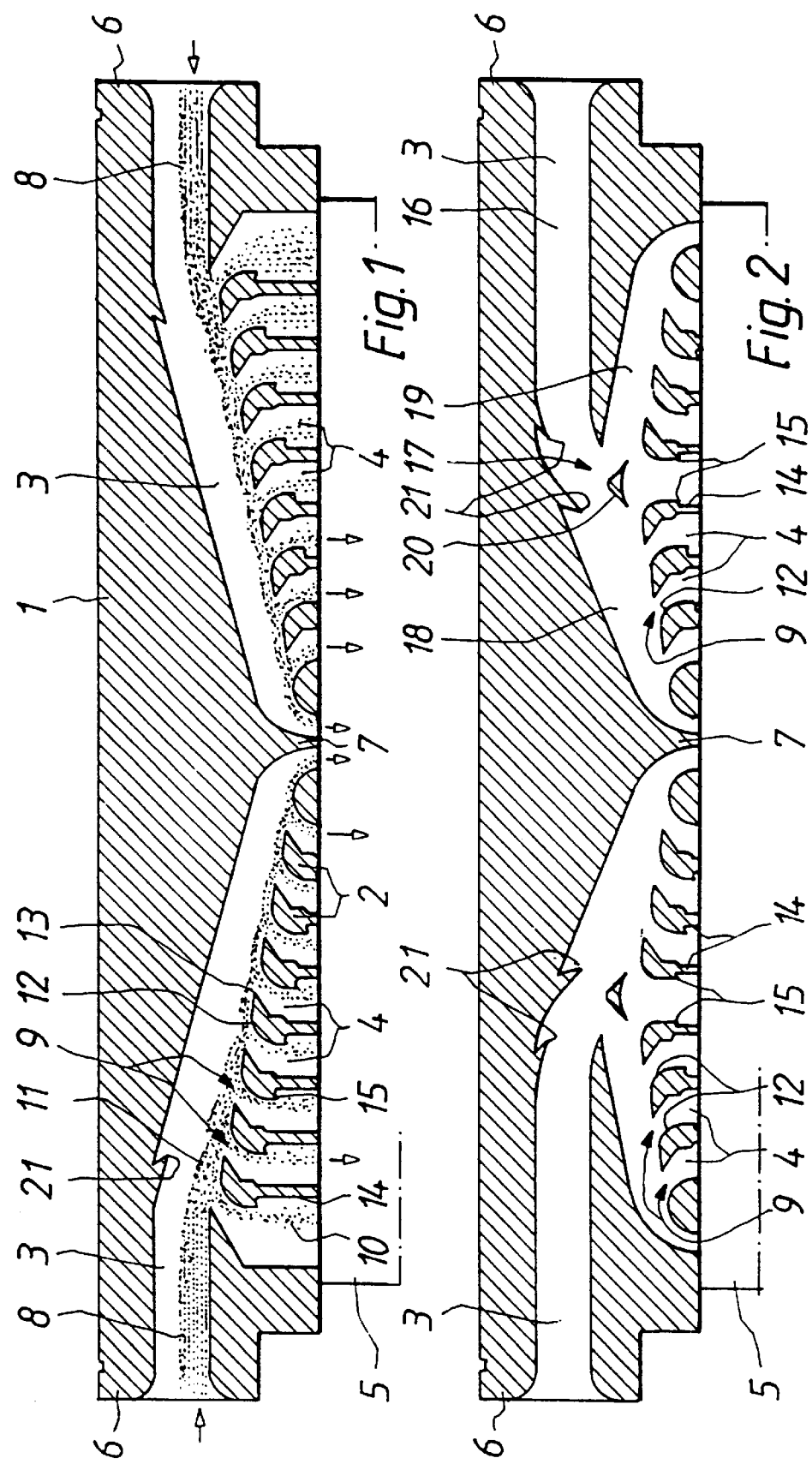

LIQUID DISTRIBUTOR FOR EVAPORATOR

BACKGROUND OF THE INVENTION

The present invention relates to a liquid distributor for an evaporator, which liquid distributor is particularly well suited to a film evaporator meant for liquid suspensions containing solid particles and incorporates a channel array located at the top of the liquid-evaporating heat transfer surface for distributing the liquid along the whole width of the surface, said channel array comprising a transversal supply channel and a number of distribution channels branching off downwardly therefrom and leading to the heat transfer surface.

In an evaporator where liquid flows as a thin film on the heat transfer surface, the whole surface must be covered with liquid in order to achieve an efficient heat transfer. Moreover, while evaporating a liquid suspension containing solid particles, growing solid contents at the borders of dry areas and areas covered with liquid would lead to a situation where the heat transfer surface would get dirty very rapidly. Thus an even distribution of the liquid to be evaporated is an absolutely necessary condition for an efficient operation of the evaporator.

The state where the heat transfer surface is covered with water can be maintained and improved by increasing the amount of liquid to be fed on the surface. This, however, also increases both the energy consumption in the pumping and the thickness of the flowing liquid film, which then weakens the heat transfer coefficient. Therefore it has been customary in liquid distributors of evaporators to use fairly narrow liquid channels, which are then easily choked while evaporating solids-containing liquid suspensions.

From the Finnish publication print 86,961 there is known a heat exchanger meant for evaporating liquids and comprising a number of adjacent bags made of a plastic film, and the film surfaces serve as the heat transfer surfaces. The liquid to be evaporated is fed onto the outer surfaces of the bags through a channel system provided in a honeycomb structure located at the top end of the evaporator, the adjacent channels extending over the whole width of the bags. The employed heating medium is steam conducted into the bags via the same honeycomb structure, said steam being created in the evaporation process and compressed in a compressor.

The apparatus described in the FI publication 86,961 is meant for distilling sea water into drinking water. Another application mentioned in said publication is the concentration of solutions and suspensions, such as bleaching effluents. However, in this case the apparatus has the drawback that the fiber material and other solid particles contained in the suspension tend to block the narrow, diagonal liquid channels provided in the honeycomb structure.

The FI patent application No. 944,471, identified for priority in International Publication No. WO96/09872 published on Apr. 4, 1996, which is related to the present invention in a way stipulated under § 2, paragraph 2 of the Finnish Patent Law, describes a liquid distributor for an evaporator, which is particularly designed for the treatment of fiber-containing effluents of the wood-processing industry, such as spent lye or bleaching effluents from chemical pulp digestion, or for the treatment of food industry sewage forming carbonate, oxalate and other deposits. This liquid distributor particularly aims at avoiding the problem of blocked channels caused by the solid particles contained in the suspension under treatment. Said liquid distributor comprises a diagonally downwards inclined supply channel and a number of distribution channels branching off therefrom and leading to the heat transfer surface, where the respective flow division takes place on the rounded division surface located on the downstream side with respect to the supply flow at the channel junction. By means of the described arrangement, on the liquid flow path there are eliminated sharp edges to which the solid particle accumulations could stick to.

In the liquid distributor specified in the FI application No. 944,471, the width of each vertical distribution channel is constant for the whole length of the channel after said rounded division surface. Practice has shown that this type of channels have the drawback that if the channel is completely filled with liquid, there is created a strong suction owing to siphonage, and this suction prevents the desired division of the flow on the division surface, while the distribution channel absorbs an excessively high proportion of the liquid flow. If such a siphonage flow is created in one of the distribution channels first branching off of the supply channel, the result is that the peripheral area of the heat transfer surface obtains an excessive amount of liquid to be evaporated, whereas the amount of water distributed on the middle areas is slight, or the middle area may even remain partly dry. Hence the aim for an even liquid distribution is not achieved.

BRIEF SUMMARY OF THE INVENTION

The object of the present invention is to improve the liquid channel array in a liquid distributor of an evaporator, so that the above mentioned drawback is avoided. The invention is characterized in that each distribution channel is provided with a step-shaped expansion, connected to the downstream side of the flow via a sharp point, in order to restrict the liquid suction created in the distribution channel.

According to the invention, the sharp step provided at the side of the distribution channel, located under the advantageously rounded division surface at the junction of the supply channel and the distribution channel, serves as an effective stop to a siphonage flow and prevents the distribution channel from absorbing excessive amounts of the liquid that flows to the channel junction from the supply channel. Except for the step-shaped expansion, the design of the channels and their junctions may essentially correspond to those suggested in the FI application 944,471. Thus the supply channel can be inclined diagonally downwards, the distribution channels can be mainly vertical and at the channel junctions, on the upstream side opposite to the rounded, curved division surface provided on the downstream side, there can be provided a sharp point from which the supply flow jumps, in a cascaded fashion, onto the division surface, on which the flow division between the channels takes place. Now the step-shaped expansion is advantageously located immediately underneath the rounded division surface.

The liquid distributor according to the invention can comprise two mutually symmetric supply channels that begin on the opposite sides of the evaporator and extend to the middle of the evaporator, so that each supply channel feeds liquid to its own half in the evaporator. In that case the supply channels are, at the sides of the evaporator, evenly inclined towards the center.

As an alternative, both of the supply channels in the liquid distributor may in their respective evaporator halves branch off symmetrically into two, so that one of the branches is directed towards the middle of the evaporator, whereas the second branch is directed back towards the side of the evaporator. Now the advantageously essentially vertical distribution channels leading to the heat transfer surface deviate from said branches of the supply channel, which are advantageously inclined diagonally downwards. In addition, the supply channel junctions can be provided with a suitable flow guide positioned against the entering direction of the supply flow, which flow guide divides the flow essentially evenly into two, between the two symmetrical branches of the supply channel.

According to the invention, at the side of the supply channel there can also be arranged one or several sharp points in order to restrict the liquid suction created in the supply channel. These points prevent a possible siphonage flow that could absorb excessive amounts of liquid to the center of the liquid distributor, at the expense of the distribution channels that branch off from the supply channel in a location further away, nearer to the periphery.

The invention is explained in more detail below, with reference to the appended drawing, where

BRIEF DESCRIPTION OF THE DRAWING

FIG. 1 illustrates a liquid distributor according to the invention in a vertical cross-section, and FIG. 2 illustrates another liquid distributor according to the invention in a vertical cross-section.

DESCRIPTION OF THE PREFERRED EMBODIMENTS

The liquid distributors according to the invention, described here by way of examples, are suited to be used in heat exchangers that in their basic structure and principles of operation conform to the one specified in the FI publication 86,961, where they guide the liquid suspension to be evaporated towards the outer surfaces of the bag-like elements made of plastic film. The steam created of the liquid is collected and conducted, via a compressor, to a higher pressure, and after being compressed to temperature, it is fed to inside the elements to serve as heating steam, which in heat transfer is condensed back to liquid. As an alternative, the elements can be heated with steam produced by some other method.

The liquid distributor according to FIG. 1 comprises a frame made of interconnected extruded plastic parts 1, 2, and a liquid channel array 3, defined by the frame. The length of the liquid distributor is somewhat larger than the width of the heat transfer surface 5 of the bag-like element made of plastic film. The liquid channel array is formed of supply channels 3 that start at the end 6 of the distributor and are diagonally inclined towards the center 7 of the distributor, as well as of mainly vertical distribution channels 4 that branch downwardly off the supply channels 3 and lead to the heat transfer surface 5. The channel arrays provided in the two halves of the liquid distributor are symmetrical with respect to the center 7 of the distributor.

The purpose of the liquid channel array is to distribute the liquid suspension 8, which is fed in at the sides of the evaporator — i.e. at the ends 6 of the distributor — to the system in order to be evaporated, as evenly as possible over the whole width of the heat transfer surface 5. At each junction 9 of the supply channel 3 and the distribution channel 4, the flows proceeding in the supply channels 3 are divided into a partial flow 10 to the distribution channel, and into a successive partial flow 11 along the supply channel. Each division takes place on the rounded division surface 12, located at the junction 9, on the downstream side with respect to the supply flow. At each junction 9, on the upstream side with respect to the supply flow, opposite to the division surface 12, there is provided a sharp feed point 13, from which the flow proceeding in the supply channel 3 jumps over the end of the distribution channel 4 onto the division surface. Thus the flow 8, 11 in the supply channel 3 proceeds in a cascaded fashion via the feed points 13 from one division surface 12 to another, simultaneously as the partial flows 10 departing therefrom to the distribution channels 4 apply the suspension evenly over the whole width of the heat transfer surface 5.

In order to ensure an even distribution of the suspension to be evaporated, in each distribution channel 4 of the invention, on the downstream side of the supply channel thereof with respect to the flow 8, 11, immediately below the rounded division surface 12, there is formed a step-shaped expansion 14, which is bordered by a sharp edge 15 located underneath the division surface. The partial flows 10 of the distribution channels 4 pass by said points 15 so that the expansions 14 are filled with the steam phase created in between the heat transfer elements. The steam phase is used for preventing the strong suction created in the distribution channels due to siphonage, which suction would absorb an excessive amount of the suspension into said channel and would leave the distribution channels located further towards the middle of the distributor with too little liquid, even dry in the worst case. In similar fashion for preventing the siphonage effect, the supply channels 3 are provided with sharp points 21 serving as stops for siphonage, and the steam phase can enter the supply channels 3 at those ends that are located on the side of the center 7 of the distributor.

The liquid distributor according to FIG. 2 differs from the one illustrated in FIG. 1 mainly with respect to the shape of the supply channels 3. Each of the supply channels 3 located in their respective evaporator halves comprises a horizontal part 16 starting at the end 6 of the distributor, and this is followed by a junction 17, where the supply channel branches off to two branches 18, 19. From the junction 17, one branch 18 is inclined diagonally towards the center 7 of the distributor, whereas the second branch 19 is inclined diagonally backwards, towards the edge of the heat transfer surface 5. Moreover, the junction 17 is provided with a flow guide 20 in order to divide the supply flow essentially evenly between the branches 18, 19. The distribution channels 4 leading to the heat transfer surface 5 deviate from the branches 18, 19 of the supply channel 3, comprising rounded division surfaces 12 at the junctions 9, as well as step-shaped expansions 14 provided downstream with respect to the supply flow and bordered by sharp points 15, in order to stop the siphonage flow. On the side above the supply channel 3, above the flow guide 20, there are formed sharp points 21, which operate as siphonage stops in the supply channel.

Let us point out that the shaping of the supply channels according to the invention illustrated in FIG. 2 also is possible without the step-shaped expansions provided in the distribution channels. The advantage of this arrangement is that it is less susceptible to possible blockages caused by solid particles contained in the suspension than the channel arrangement according to FIG. 1.

It is obvious for a man skilled in the art that the various different embodiments of the invention are not restricted to those illustrated by way of example in FIGS. 1 and 2, but may vary within the scope of the appended claims.

We claim:

1. A liquid distributor for use with a film evaporator to distribute liquid suspensions containing solids, comprising a channel array (3, 4), provided at the top of a liquid-evaporating heat transfer surface (5), for distributing liquid (8) fed in at the side of the evaporator over the whole width of the surface, said channel away including at least one transversal supply channel (3) and a number of downwardly deviating distribution channels (4) leading to the heat transfer surface, and a step-shaped expansion (14) in each distribution channel 4 connected via a sharp point (15) to the downstream-side of the supply channel, with respect to the flow (8, 11) of the supply channel, for restricting the liquid suction created in the distribution channel.

2. A liquid distributor according to claim 1, wherein the supply channel (3) inclines diagonally downwards, and the distribution channels (4) are mainly vertical.

3. A liquid distributor according to claim 1 or 2, wherein each junction (9) of the supply channel (3) and distribution channel (4) is provided with a rounded division surface (12) located on the downstream side of the supply flow (8, 11), on which division surface (12) the flow is divided between the channels, and the step-shaped expansion (14) is located immediately underneath the division surface.

4. A liquid distributor according to claim 3, wherein each junction (9) of the supply channel (3) and the distribution channel (4) is bordered by a sharp point (13) on the upstream side of the supply flow.

5. A liquid distributor according to claim 1 or claim 2, wherein the at least one transversal supply channel comprises two mutually symmetrical supply channels (3), which begin at the opposite sides of the evaporator and extend to the center (7) of the evaporator, so that both of the supply channels feed liquid to their respective halves in the evaporator.

6. A liquid distributor according to claim 5, wherein both supply channels (3) are evenly inclined at the evaporator sides towards the center (7) of the evaporator.

7. A liquid distributor according to claim 5, wherein both supply channels (3) branch in their respective evaporator halves into two, so that one branch (18) continues towards the center (7) of the evaporator, and the second branch (19) is directed back towards the side of the evaporator, and the distribution channels (4) leading to the heat transfer surface (5) depart from said branches of the supply channel.

8. A liquid distributor according to claim 7, wherein a junction (17) of the supply channel (3) is provided with a flow guide (20) which distributes the feed flow essentially evenly between the two symmetrical branches (18, 19) of the channel.

9. A liquid distributor according to claim 7, wherein the supply channel (3) is essentially horizontal (16) as far as its junction (17), whereas the branches (18, 19) of the supply channel are inclined diagonally downwards.

10. A liquid distributor according to claim 1 or claim 2, wherein the top side of the supply channel (3) is provided with at least one sharp point (21) in order to further restrict the liquid suction created in the supply channel.

* * * * *

UNITED STATES PATENT AND TRADEMARK OFFICE
CERTIFICATE OF CORRECTION

PATENT NO. : 6,068,730
DATED : May 30, 2000
INVENTOR(S) : Leif Ramm-Schmidt, Veli Tiainen, Peter Koistinen and Hemmo Eriksson It is certified that error appears in the above-indentified patent and that said Letters Patent is hereby corrected as shown below:

In the ABSTRACT, line 2, cancel "includes" and substitute --comprises--

Column 5, line 3 (claim 1), cancel "away" and substitute --array--

Signed and Sealed this

Twenty-ninth Day of May, 2001

*Attest:*

NICHOLAS P. GODICI

*Attesting Officer*     *Acting Director of the United States Patent and Trademark Office*